United States Patent
Chellis et al.

(10) Patent No.: US 7,284,190 B2
(45) Date of Patent: Oct. 16, 2007

(54) AUTOMATICALLY GENERATED COMPATIBILITY REPORTS

(75) Inventors: Keith B. Chellis, Kirkland, WA (US); J. Joanne Zhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 10/892,067

(22) Filed: Jul. 15, 2004

(65) Prior Publication Data

US 2006/0015807 A1    Jan. 19, 2006

(51) Int. Cl.
    *G06F 15/00* (2006.01)
(52) U.S. Cl. .................. 715/511; 715/500.1; 715/515; 715/526
(58) Field of Classification Search ................ 715/511, 715/526, 500.1, 515
    See application file for complete search history.

(56) References Cited

U.S. PATENT DOCUMENTS 5,963,641 A * 10/1999 Crandall et al. ................ 380/2
2001/0013043 A1 * 8/2001 Wagner ....................... 707/511

OTHER PUBLICATIONS

Mactopia, "Are your documents compatible? Check for it!", Updated Apr. 23, 2004, pp. 1-2, http://www.microsoft.com/mac/products/word2004/using.aspx?pid=usingword2004&type=howto& article=/mac/LIBRARY/how_to_articles/office2004/of_compatibility.xml.*

Schwartz, Steve, "Microsoft Office 2004 for Mac OS X: Visual Quickstart Guide," Jul. 29, 2004, PeachPit Press, pp. 1-8.*

Patterson, Ben, "CNET Reviews: Microsoft Office 2004 for Mac Standard Edition", Cnet, May 19, 2004, pp. 1-7, http://reviews.cnet.com/4505-3524_7-30671176.html.*

Rosenbaum, Stephanie. "Compatibility: A Barrier to Applying Technology to Documentation." ACM '81, Nov. 9-11, 1981. Panel Abstract, pp. 325-326.

* cited by examiner

Primary Examiner—Stephen Hong
Assistant Examiner—David Faber
(74) Attorney, Agent, or Firm—Workman Nydegger

(57) ABSTRACT

The compatibility report is prepared by scanning a document that is currently open within an application to identify compatibility issues that may arise if the document is subsequently accessed using a different computing platform or a different version of the program than that used to create or edit the document. When the document is scanned, each compatibility issue that is detected by comparing the document to a set of predefined compatibility issues is added to a store. The store is then used to create a compatibility report that lists each of the compatibility issues. In addition to listing the compatibility issues, if an issue in the list is selected and highlighted, an explanation of the issue is provided. The user has the option to automatically fix the problem if possible, or can manually address the problem as suggested in the compatibility report.

25 Claims, 8 Drawing Sheets

US 7,284,190 B2

AUTOMATICALLY GENERATED COMPATIBILITY REPORTS

FIELD OF THE INVENTION

This invention generally pertains to detecting potential compatibility problems that may arise when documents are opened in different versions or computing platforms, and more specifically, pertains to automatically detecting potential compatibility problems in a document and providing an indication of such problems in a report presented to a user who is working on the document, before the document is shared with others.

BACKGROUND OF THE INVENTION

Most software applications intended for producing documents have been released for sale to the public in an initial version, e.g., version 1.0, and over time, successively newer versions have been developed and made available for purchase. Each new version typically incrementally adds functionality and features. Occasionally, the added features in a new version require that changes be made in the format in which a document is saved, compared to the format used for such documents an earlier version of the program. Also, because editing or even accessing the new features or functionality in a document will often only be possible using the new version of the software code, a document that includes any of the new features or functionality may not be entirely backwards compatible with earlier versions of the software program that was used to create or edit the document.

Another common compatibility issue arises if the document was created using a software application written to run on one computing platform (i.e., on a computer using a specific type of processor and/or operating system), and the document is to be accessed using a different type of processor/operating system. Although the document may be distributed to someone who is using a similar software program that was designed to run on a different computing platform and/or operating system, the functionality and feature sets of versions of the program written for different computing platforms and/or operating systems may be different. For example, Microsoft Corporation sells the OFFICE™ Suite of software applications, which includes WORD™ word processing and EXCEL™ spreadsheet programs, for both the WINDOWS™ operating system and the APPLE™ operating system that is used on Apple MACINTOSH™ computers. However, the functionality and feature sets in the two products written for use on the different platforms and operating systems are somewhat different, and the release of a new version written for use on one computing platform and operating system may not coincide with a corresponding release of a new version written for use on the other computing platform and operating system.

Sometimes, compatibility issues can arise due to differences in related software that may be available on one user's computer, but not on another, even though the computing platforms and operating systems employed by the two users are generally identical. A good example of this type of compatibility problem is the effect on the appearance of a document when a specific font is employed by the creator or editor of the document that is distributed to another who is using a computer on which that font is not installed. While a substitution font may be applied to address this issue, the look of a document can be substantially altered if a font used in its creation or in its edited form is unavailable on the computer used by another person who is accessing the document for display or printing.

Clearly, although it may not be possible to ensure that all documents created using a software program are compatible when accessed with all versions of the software program, it would be desirable for a user who is creating or editing a document to be provided a warning of any potential compatibility problems. Thus warned, a user might elect to change the document to eliminate the cause of incompatibility, or take other appropriate steps to address the problem. Of course, the warning might be freely disregarded if the user is certain that the incompatible software or computer platform will not be used by others who will be accessing the document. Nevertheless, by providing a user with a warning of potential compatibility problems in regard to documents that are being created or edited, the user would have the option, where possible, to correct the potential problem. The fix might be as simple as embedding a specific font in the document, if the user knows that the font is not likely to be available on the computers of others interested in accessing and printing the document.

SUMMARY OF THE INVENTION

Since a person who has prepared or edited a document may have expended considerable effort in achieving a desired appearance for the document, the present invention seeks to provide a warning about problems that may arise when the document is opened by someone using either a different version of the application used to prepare or edit the document or using an application that was written to run on a different computing platform. In the following discussion and the claims that follow, the term "computer platform" is intended to encompass a type (but not necessarily a brand) of processor and the corresponding components employed in a computing system, as well as the operating system(s) employed for that type of computing system. Examples of two different computing platforms are the Apple MACINTOSH™ computer and associated Apple operating systems, and the IBM compatible personal computer and Microsoft Corporation WINDOWS™ operating systems. The processors used in these two different computing platforms employ incompatible sets of machine language instructions, and their respective graphical user interface operating systems are very different in design and functionality.

It is also contemplated that the present invention might identify compatibility issues between different application programs, in regard to documents prepared on one application that are converted to the format of another application. An example of this type of incompatibility might be the differences in a Microsoft Corporation's WORD™ document compared to the document after it has been converted to Corel Corporation's WORD PERFECT™ document. In addition, the present invention is not limited only to identifying compatibility problems in office productivity programs, but more generally, can be used for identifying compatibility issues between documents created or edited by almost any type of application that may be executed on different computer systems (even of the same type, if font or other software modules or resources are not available on the other computing system). For example, if a computer system running a photo editing program that includes a plug-in module, which may not have been installed on another computer, the appearance of a photo image may be different on the two systems; and the present invention might identify this compatibility problem.

A first aspect of the present invention is directed to a method for providing a warning to a user when a document that has been created or changed by the user will differ when the document is accessed in a target application. In response to a predefined state of the document, the method provides for triggering a scan of the document to detect any compatibility issue that would arise when the document is accessed in the target application. The compatibility issues are detected based upon a comparison of the document with a plurality of predefined compatibility issues that may exist for the target application. Each compatibility issue detected is included in a report of compatibility issues that is displayed to the user.

The method preferably further includes the step of providing an explanation within the report of any compatibility issue that is detected. This explanation can be accessed by selecting a specific compatibility issue in the report.

The predefined state can occur when the user activates a control to selectively trigger the scan of the document to produce the report of compatibility issues, or when the user edits the document, causing each change to the document to be scanned to detect any compatibility issue resulting from the change, or when the user attempts to save the document.

Upon reviewing the report, a user is enabled to either selectively fix a specific compatibility issue indicated in the report of compatibility issues, or selectively ignore the specific compatibility issue. As a further option, the user is enabled to selectively preclude the display of the report of compatibility issues during a current session, or selectively preclude compatibility issues from subsequently being detected in any document accessed by the user (unless this decision is later reversed by the user). The user can also selectively display a proposed fix for a selected compatibility issue. For some compatibility issues where it is possible to do so, if the proposed fix is accepted, the method provides for automatically applying the proposed fix to the document to correct the compatibility issue.

In a preferred exemplary application of the present invention, the predefined compatibility issues identify differences between a current appearance of the document and an appearance of the document when the document is either printed or displayed by the target application, if the target application is a different version than an application with which the document was either prepared or edited, or if the document is either printed or displayed by the target application using a different type of computing platform than that with which the document was either prepared or edited. Similarly, the predefined compatibility issues may warn of differences in appearance if the document is either printed or displayed by the target application when a font used in the document is not available to the target application.

The predefined compatibility issues typically relate to at least one of a graphic component, a font, a text characteristic, or a format used in the document, or to a software module used to carry out a functionality in the document, or a parameter applied to a graphic component included in the document. In an initial embodiment in which the present invention is employed, the document is a word processing document, a spreadsheet, or a presentation document. However, it is not intended that the present invention in any way be limited to use with these types of documents.

Before initiating the scan of the document, the user is enabled to select the target application from among a plurality of predefined target applications. For example, if working on a word processing document, the user might select as a target application other versions of the word processing program currently being used to create or edit the document. Thus, the plurality of predefined target applications include at least one of different versions of an application in which the document is currently open and a different computing platform than that on which the document is currently open.

Another aspect of the present invention is directed to a memory medium having machine executable instructions for carrying out steps that are generally consistent with the steps of the method discussed above. Yet another aspect of the present invention is directed to a system for providing a warning to a user when a document that has been created or changed by the user might differ when the document is accessed in a target application. The system includes a user input device enabling a user to provide input when creating and editing documents, and a display for displaying documents and visual material. A processor is coupled to the user input device and to the display, as well as to a memory. The memory stores data for a document and machine instructions for carrying out a plurality of functions that are again generally consistent with the steps of the above method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 9:
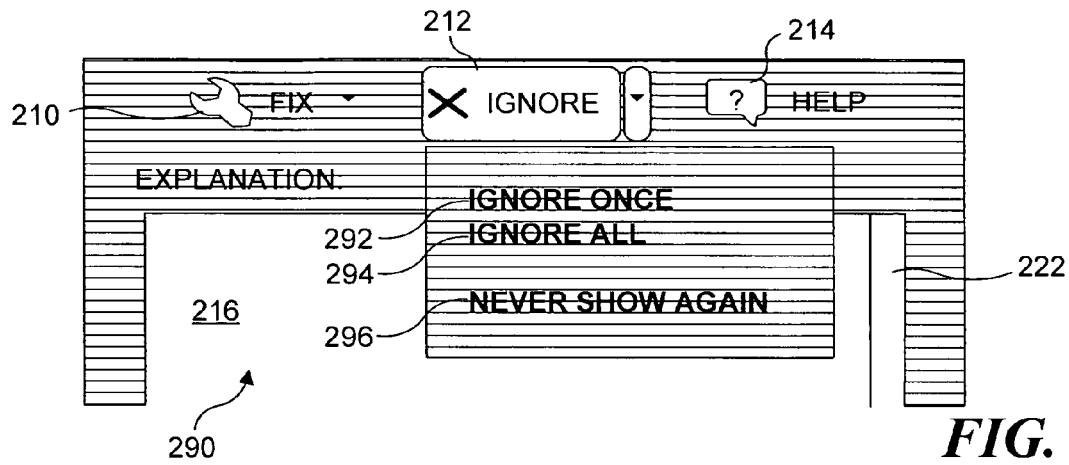
Figure 10:
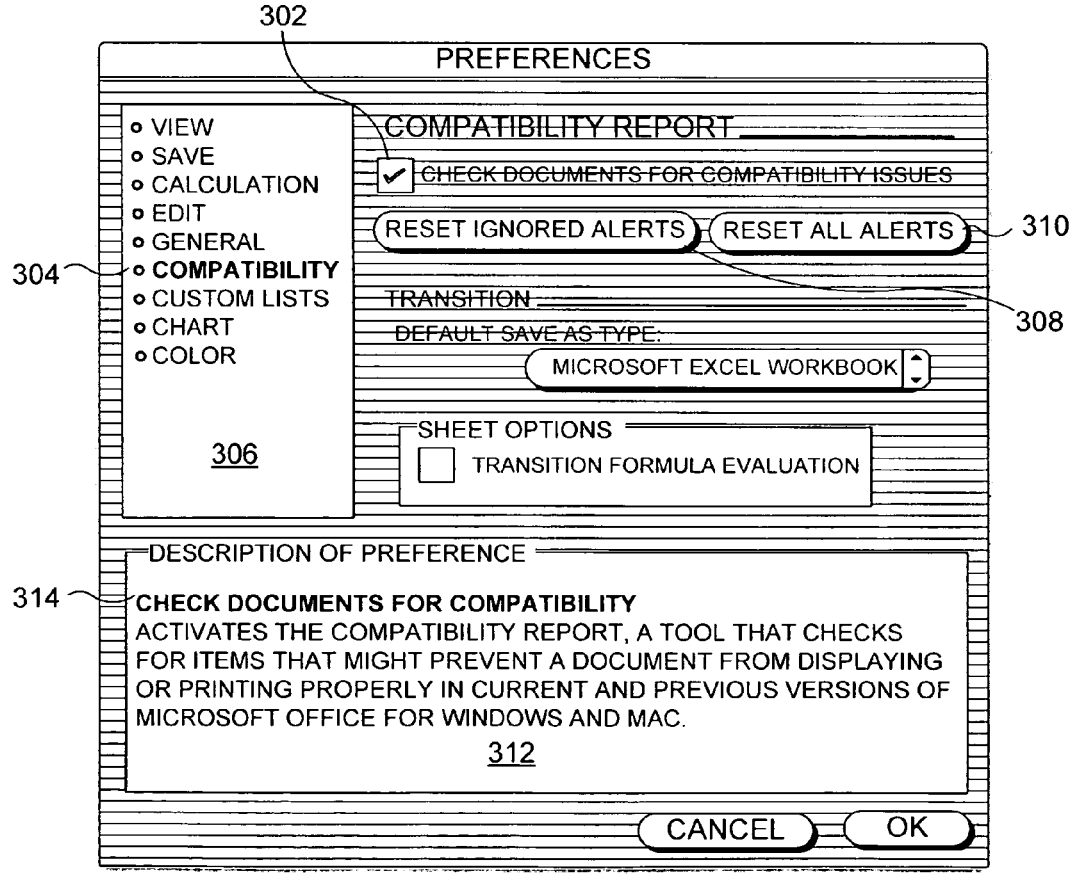

FIG. 9 illustrates a portion of one exemplary drop down list from which the user can select an option to ignore one or all compatibility issues, or an option prevent any further compatibility issue scanning of documents created or edited by the user; and FIG. 10 is a preferences dialog for a spreadsheet program, in which a user can selectively choose to check spreadsheet documents for compatibility issues.

DESCRIPTION OF THE PREFERRED EMBODIMENT

Exemplary System for Implementing the Present Invention

Figure 1:
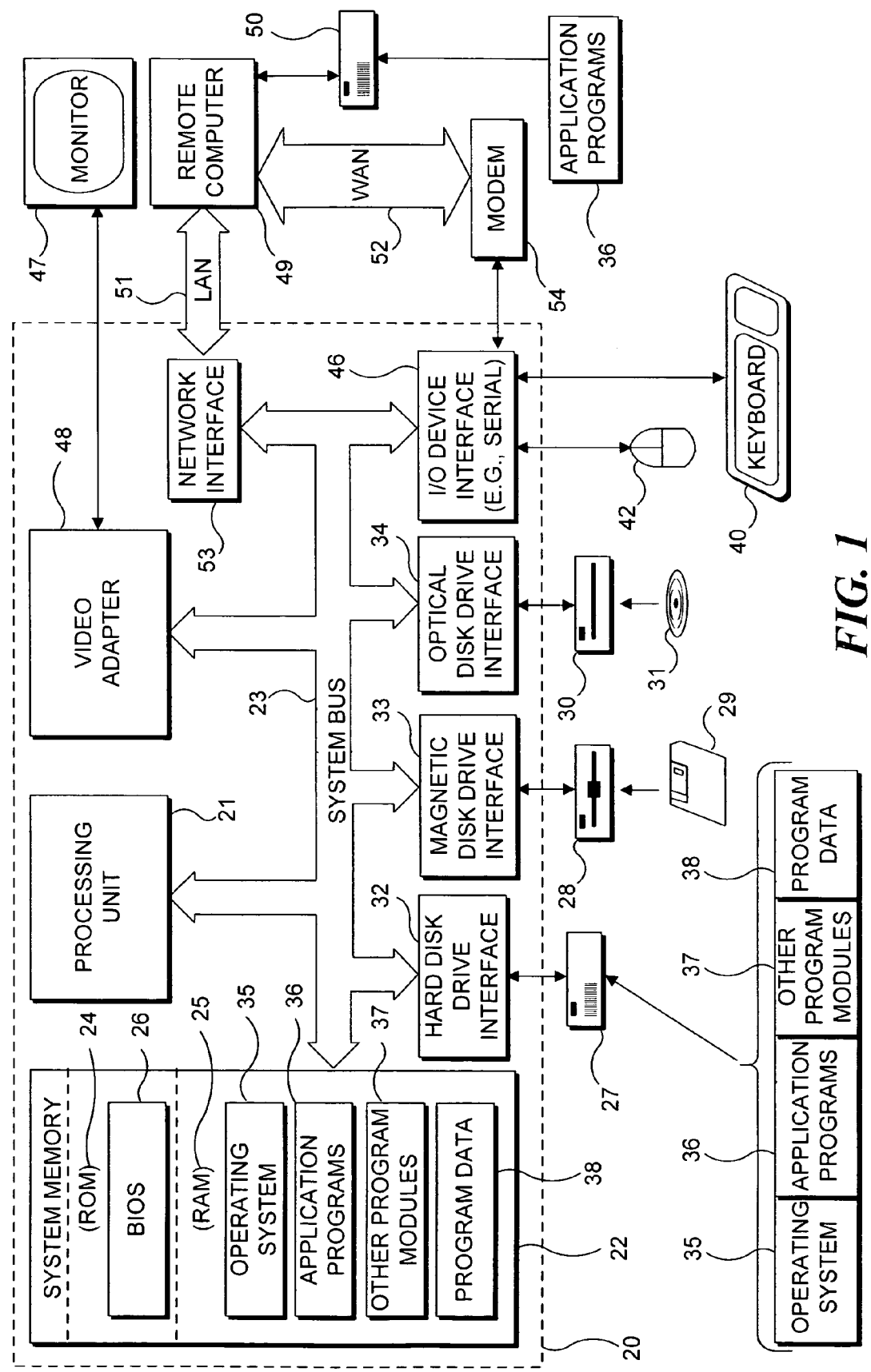
FIG. 1 is a functional block diagram of a generally conventional computing device, such as a personal computer (PC), suitable for use in carrying out the present invention.

With reference to FIG. 1, an exemplary system for implementing the present invention includes a general purpose computing device in the form of a conventional personal computer 20 (e.g., a MACINTOSH PC), provided with a primary processing unit 21 (e.g., a POWERPC processor), a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (1310S), containing the basic routines that helps to transfer information between elements within personal computer 20, such as during start up, is stored in ROM 24. Personal computer 20 further includes a hard disk drive 27 for reading from and writing to a hard disk, not shown, a magnetic disk drive 28 for reading from or writing to a removable magnetic disk 29, and an optical disc drive 30 for reading from or writing to a removable optical disc 31, such as a CDROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer readable media provide nonvolatile storage of computer readable machine instructions, data structures, program modules and other data for personal computer 20. Although the exemplary environment described herein employs a hard disk, removable magnetic disk 29, and removable optical disc 31, it will be appreciated by those skilled in the art that other types of computer readable media, which can store data that are accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disc 31, ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48 that comprises graphics hardware, including a graphics processing unit (GPU) and VRAM. In addition to the monitor, personal computers are often coupled to other peripheral output devices (not shown), such as speakers (through a sound card or other audio interface—not shown) and printers.

Personal computer 20 may operate in a networked environment using logical connections to one or more remote computers, such as a remote computer 49. Remote computer 49 may be another personal computer, a server, a router, a network personal computer, a peer device, or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, personal computer 20 is connected to LAN 51 through a network interface or adapter 53. When used in a WAN networking environment, personal computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used.

Logical Steps for Carrying out the Present Invention

An initial preferred embodiment of the present invention was developed for execution on the Apple MACINTOSH™ computer system, for execution under the Apple operating system. However, it should be understood that the present invention is not any way limited to execution on this particular type of computing platform or under that specific operating system, since it is also readily applicable to other computing platforms and within other operating systems. Moreover, in the examples that are shown below, the present invention is illustrated in an exemplary fashion in connection with providing compatibility reports in connection with Microsoft Corporation's WORD™ word processing program, its EXCEL™ spreadsheet program, and its POWERPOINT™ presentation program for the Apple Corporation's MACINTOSH computer. Again, the present invention is clearly applicable to other types of applications besides those in the office program suite that was written for the MACINTOSH computer by Microsoft Corporation. In general, the present invention is intended to provide a warning to a user when a potential compatibility problem or issue may exist in regard to a selected target application or computing platform. If a document that is being created or edited by a user may not appear identical if accessed in a different version of the application program being used by the current user, or in an application of that type designed for a different computing platform, or in some instances, even the same version of the application when opened on a different computer (not provided with identical program components, such as fonts or computer modules), the present invention is intended to warn the user about the potential compatibility issue(s).

Figure 2:
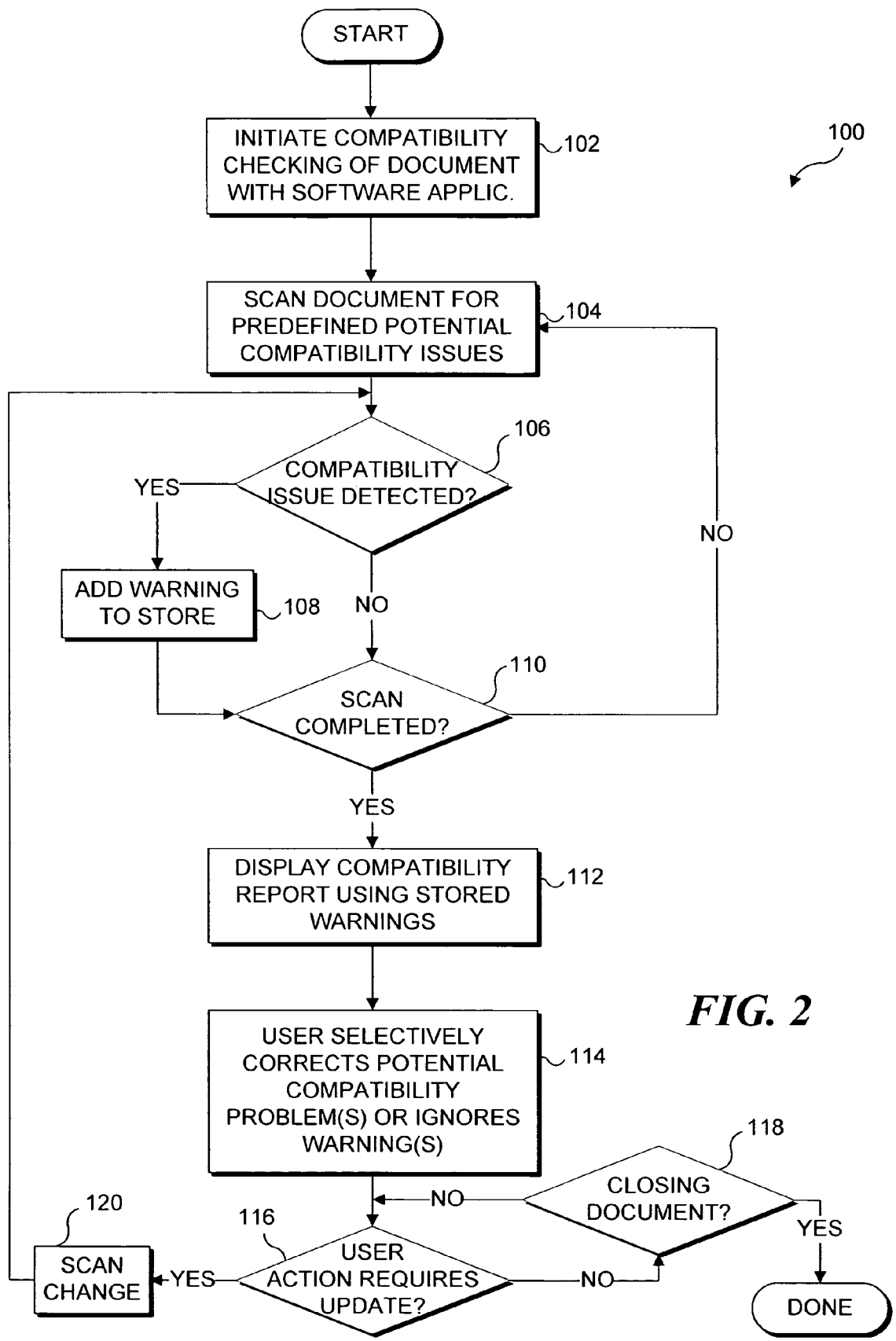
FIG. 2 is a flowchart showing the logical steps employed in carrying out the present invention.

A flowchart 100 in FIG. 2 illustrates the logical steps involved in implementing the present invention. It is assumed that the user has opened an application, and that using the application, a document has either been created or edited. The present invention is then employed for assessing potential compatibility issues. In a preferred embodiment, simply opening a document does not automatically initiate the compatibility scan of the document. However, the user of the application will have the option of checking the compatibility of an existing document that is opened in the application. The user interface that provides this capability is discussed below. If a document has previously been scanned for compatibility issues, e.g., during the current session, and the user has subsequently made editing changes that might introduce further compatibility issues, the user will be given an opportunity to recheck the document for such compatibility issues, or the compatibility issues will be reported when the user attempts to save the document, if the choice has been made by the user to automatically check the document for compatibility issues at that point. However, if the user has elected not to automatically check the document, the user can still manually select an option to scan the document for compatibility issues at anytime. All of these possible states of the application to trigger the scan of the document for compatibility issues are generally encompassed by step 102.

In a step 104, if the automatic checking or manual checking of the document has been initiated by the user, the document is scanned for predefined potential compatibility issues. Exemplary predefined compatibility issues are listed in Appendix A, which is attached hereto, for a word processing application, a spreadsheet application, and a presentation application.

A decision step 106 determines if any compatibility issue is detected within the document. In this step, each predefined potential compatibility issues is detected within the document as it is scanned. If so, a step 108 adds a warning regarding the compatibility issue to a store of such warnings maintained in memory on the computing system. A decision step 110 determines if the scan of the document has been completed. If not, the logic loops back to step 104 to continue checking for other predefined potential compatibility issues. It should be noted that in the preferred embodiment, the document is scanned a single time, and during this scan, any possible compatibility issues in the document are identified and included within the store.

Once an affirmative response is obtained from decision step 110 that the scan is completed, the logic continues with a step 112 that displays a compatibility report listing the stored warnings. Again, the user interface used for displaying the compatibility report is discussed below, in connection with several examples shown in the figures.

In a step 114, the user is given the option to selectively correct potential compatibility problems either manually, or by invoking an automatic approach for fixing the problem within the document, with the user's consent. Alternatively, as indicated in this step, the user may selectively choose to ignore a specific warning or to ignore all of the warnings about this specific type of compatibility issue in the document for the current session. For example, if the user knows that the document is only going to be employed by that user on the same computing platform and with the same version of the software that were used to create or edit the document, there would be little reason to be concerned about compatibility issues of any type. A user can also optionally choose not to run the scan and display the compatibility report for any future documents that the user creates or edits.

A decision step 116 determines if the user has continued to make further changes to the document that may require an update of the store of compatibility issues previously detected. If so, a step 120 scans the change just made by the user, and the logic then loops back to step 106 to determine if the change just made has raised a compatibility issue. When any changes are made by the user, only those portions of the document that include the changes actually need to be scanned, since compatibility issues previously identified in portions of the document that have not been changed still exist, unless corrected, and the unchanged portions of the document therefore do not need to again be scanned. If the user has not taken any action such as editing or requesting that the document be rechecked, following decision step 116, a decision step 118 determines if the user is closing the document. If not, the logic loops back again to decision step 116 to await any possible further user action requiring an update of the compatibility issue list. However, if the user is in fact closing the document, the logic is completed for this process.

In general, the above steps employ a tool box type user interface, an application programming interface (API) comprising a module in the application, a compatibility report API and a warning storage API. Those of ordinary skill in the art will appreciate that a variety of different program modules could be employed to implement the present invention following the logical steps shown in FIG. 2 and in FIGS. 3 and 4, which were discussed below.

Figure 3:
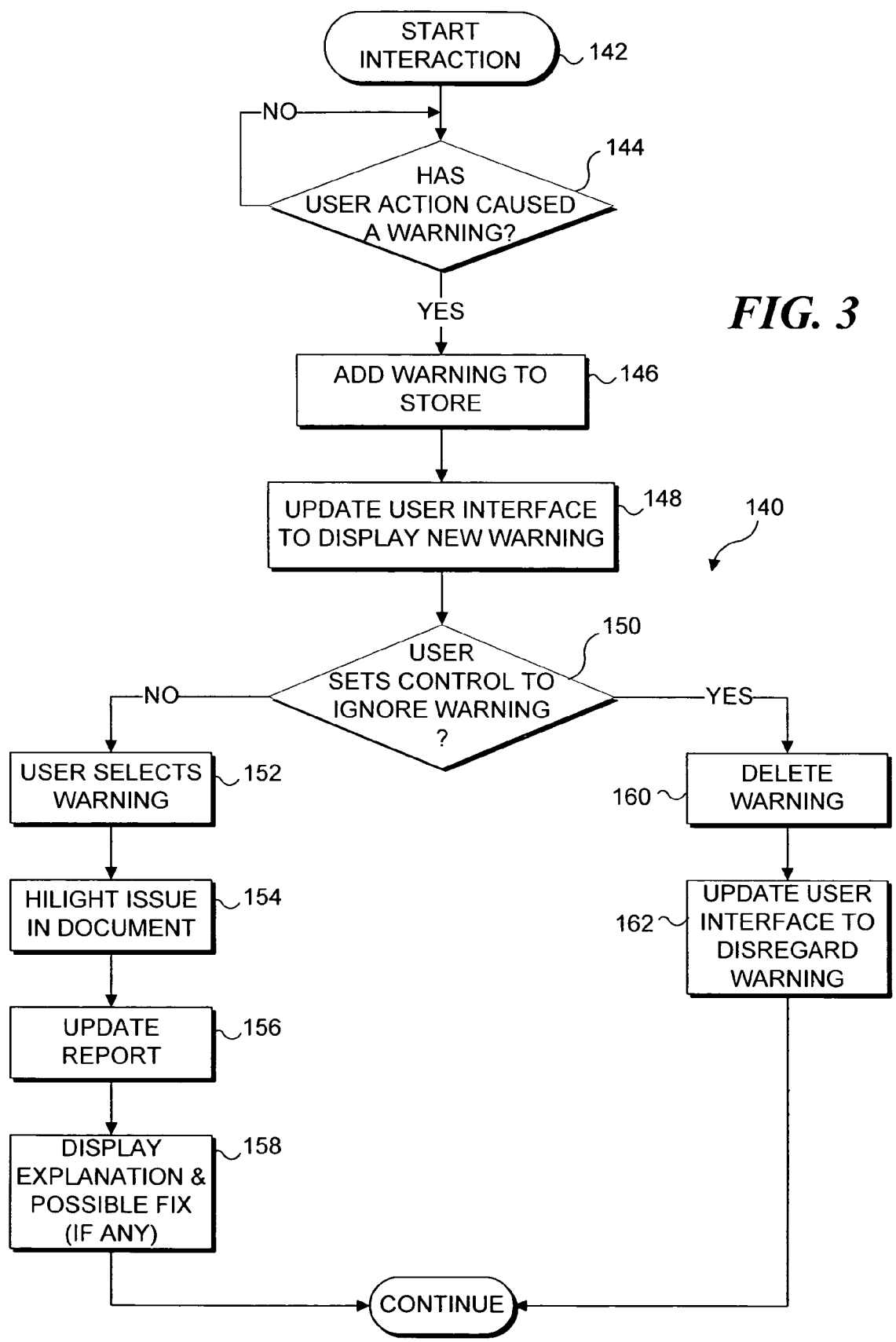
FIG. 3 is a flowchart illustrating the logical steps relating to a user interaction in connection with the present invention.

Referring now to FIG. 3, a flowchart 140 illustrates the logical steps involved in the user interaction with the application in connection with the compatibility report creation. A step 142 indicates the start of the interaction of the user with the toolbox user interface and the compatibility report API. A decision step 144 determines if any user action has caused a warning to be stored. For example, if the user has introduced a paragraph from another document into the document being edited, and if the paragraph includes a font that is not provided with the application or the operating system on a target computing platform or target application, a potential compatibility issue is created. As a result, a step 146 would add a warning corresponding to any compatibility issue detected corresponding to the changes made by the user, to the store or list of warnings being maintained in memory for the document. If the user action has not caused any warning, the logic simply loops and awaits for any such change to occur.

Following step 146, a step 148 updates the user interface to display a new warning corresponding to the warning that was added to the store in step 146. When the user selectively displays the compatibility report, the user will see the new warning that has been added. A decision step 150 determines if the user has set the controls to ignore this issue or all such warnings in the document. If not, the user can move the cursor so it is over a warning, as indicated in a step 152. In response to the user thus selecting a warning, a step 154 provides for highlighting that issue or warning that was found in the document during the scan, in the compatibility report. A step 156 updates the compatibility report so that based upon the currently highlighted issue, an explanation and possible fix (if any) are provided, as indicated in a step 158. The logic then continues, for example, with step 114 in FIG. 2.

Referring back to decision step 150, if the user has chosen to ignore a specific warning, or to ignore compatibility warnings of that type during the present session, a step 160 provides for deleting that warning from the compatibility report during the present session. Next, a step 162 updates the user interface to disregard the warning so it is not displayed to the user during this session. Thereafter, the logic then continues, generally enabling the user to further edit or close the document.

Figure 4:
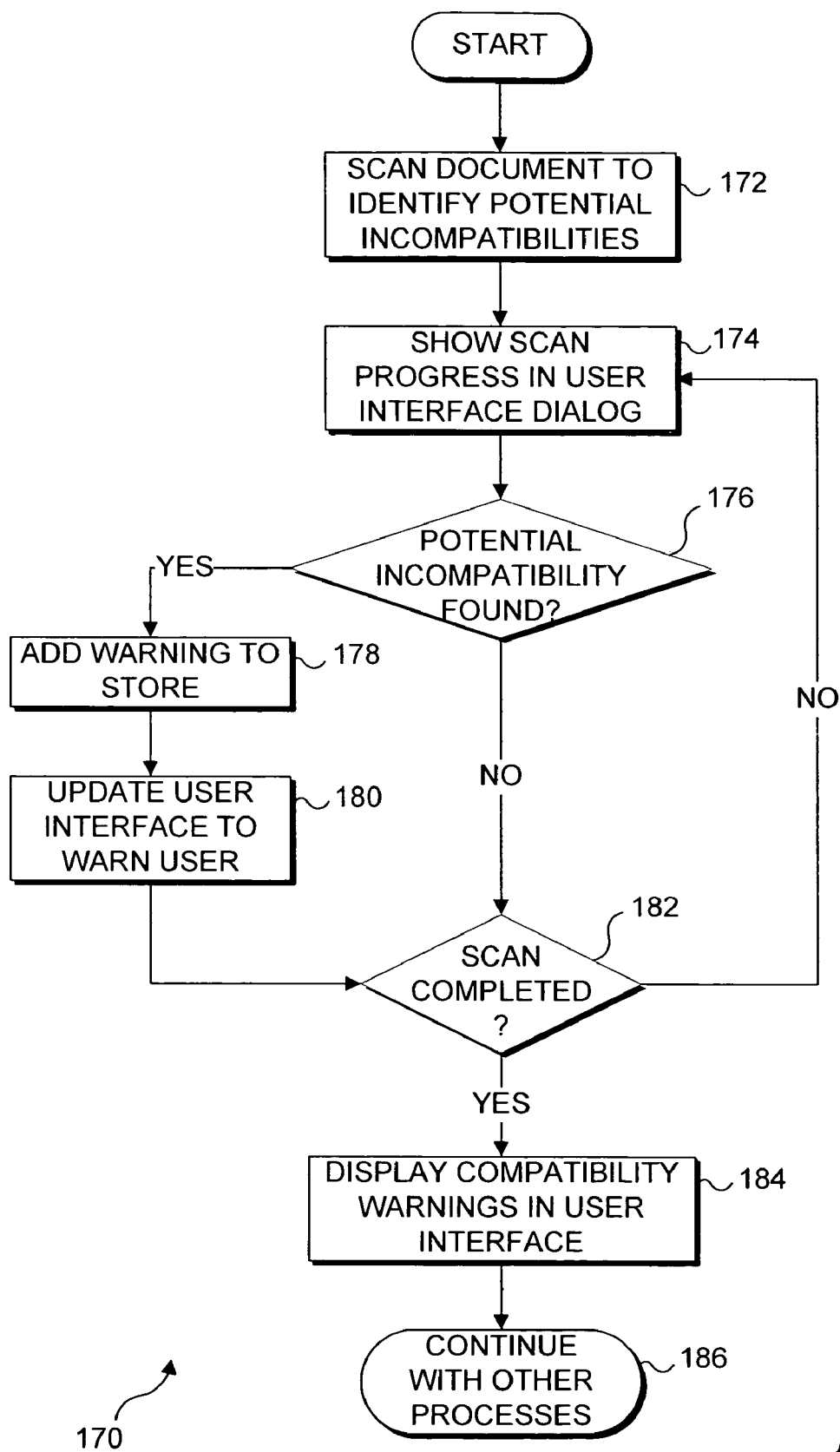
FIG. 4 is a flowchart showing the logical steps for creating or updating a report indicating any compatibility issues, in accord with the present invention.

In FIG. 4, the logical steps involved with handling the data flow in connection to the present invention are illustrated in a flowchart 170. In a step 172, the current document is scanned to identify potential incompatibilities with a target application or platform, determined as explained above. A step 174 shows the progress of the scan in the document in a user interface scan progress dialog. (See FIG. 8 in the corresponding discussion below.)

A decision step 176 determines if there is any potential compatibility issue that has been detected, and if so, a step 178 adds the warning regarding the compatibility issue to a store of such warnings maintained in memory. A step 180 then updates the user interface to warn the user about the potential compatibility issue that was just detected, either automatically, or when a recheck of the document is manually initiated by the user. Following step 180, or in the event that no potential incompatibility was found when scanning the document, a decision step 182 determines if the scan has been completed, and if not, loops back to step 174, indicating that the scan is still in progress. Once decision step 182 determines that the scan has been completed, a step 184 provides for displaying the compatibility warnings in a compatibility report within the user interface. Following the display of a compatibility report, a decision step 186 shows the logic proceeds as indicated above in connection with FIG. 2, so that the user can selectively choose to correct or ignore the warnings.

Exemplary Compatibility Reports and Related User Interface Dialogs

Figure 5:
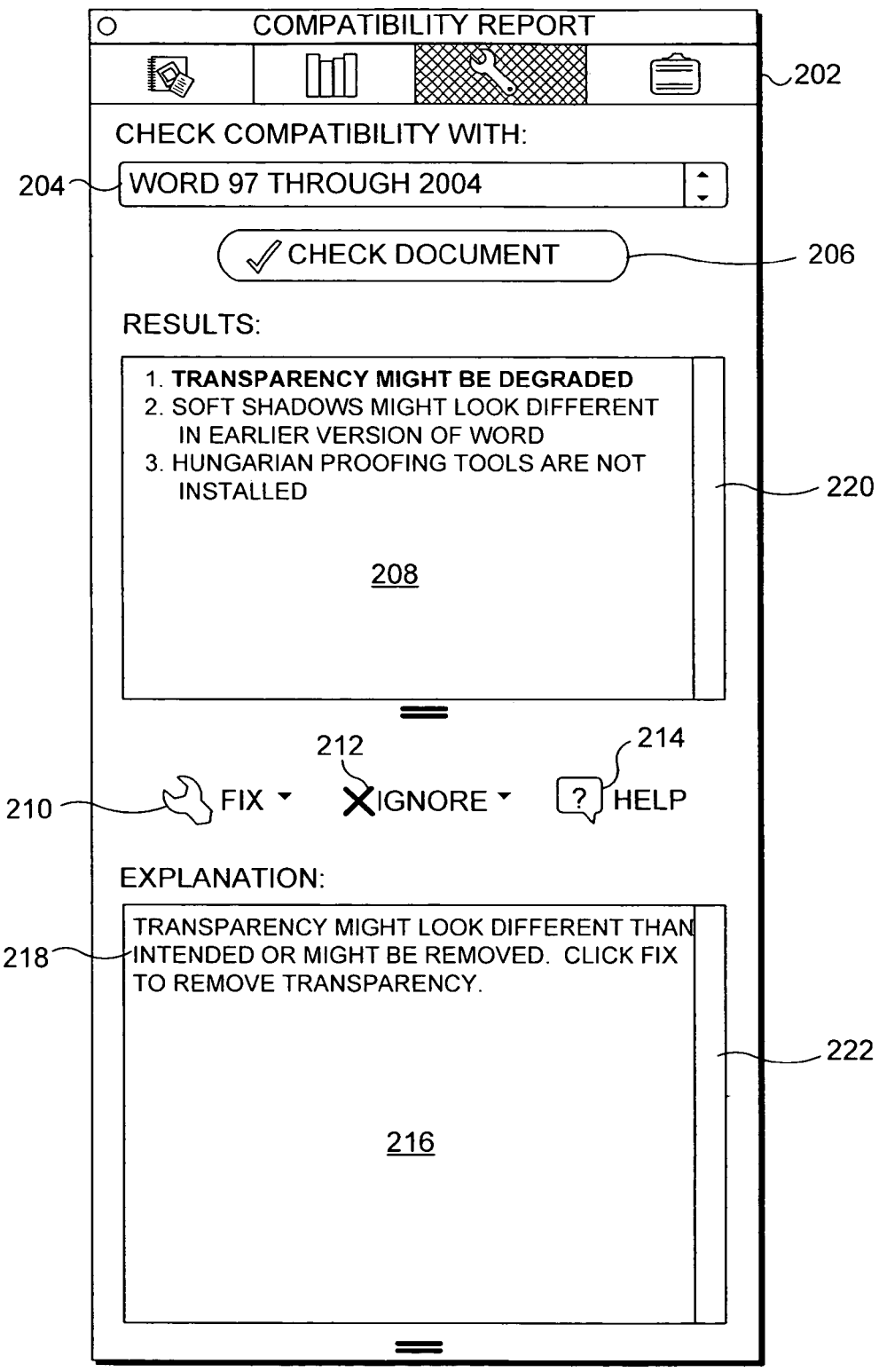
FIG. 5 is an exemplary compatibility report produced by an embodiment of the present invention after scanning a document.

FIG. 5 illustrates an exemplary compatibility report user interface 200. In this example, a tool box 202 is provided to enable the user to selectively display alternatives besides the compatibility report user interface, which is currently selected in the examples shown. Also provided is a drop down list box 204 in which a current choice for the target application is shown. Alternatively, as discussed below, the user can select a different target application or computing platform to employ when compatibility issues are detected. A Check Document control button 206 is disposed below drop down list box 204 and can be selected to activate scanning of the current document to identify any compatibility issues. This button is shown with the label it has when a document is initially loaded into an application, enabling the user to immediately scan the document if desired to determine if any compatibility issues currently exist. Once the user has started making editing changes, the "Check Document" label will be changed to "Recheck Document," indicating that only the changes introduced by the user will be checked relative to a previous scan during the current session.

In the example shown on FIG. 5, the compatibility report lists the results of the last scan in a results dialog box 208. The first compatibility issue in this list is highlighted (e.g., either by a change of background color or other visual indication), indicating that the user has selected it as a current compatibility issue to evaluate. Since the first compatibility issue is selected, an explanation dialog box 216 includes an explanation 218 for the selected compatibility issue. Scroll bars 220 and 222 are provided along the right sides of the results dialog box and the explanation dialog box, respectively, enabling the user to scroll in the event the list of compatibility issues or the explanation are longer than will fit within the current size of the dialog boxes. The dialog boxes can also be resized by the user.

Explanation 218 indicates that the user can automatically fix the currently highlighted compatibility issue relating to degraded transparency, by clicking on a Fix icon 210, which will remove the transparency currently used with one or more portions of the document that is currently active, thereby eliminating the potential compatibility issue in the target application where the transparency might be degraded. Also provided is an Ignore icon 212, which if selected, indicates the user is not interested in that specific compatibility issue in the present document. Other options displayed under the Ignore icon are displayed in a drop down box, as discussed below. A Help icon 214 is provided and if selected, enables a user to obtain further assistance or explanation in regard to any of the controls in the compatibility report user interface.

Figure 6:
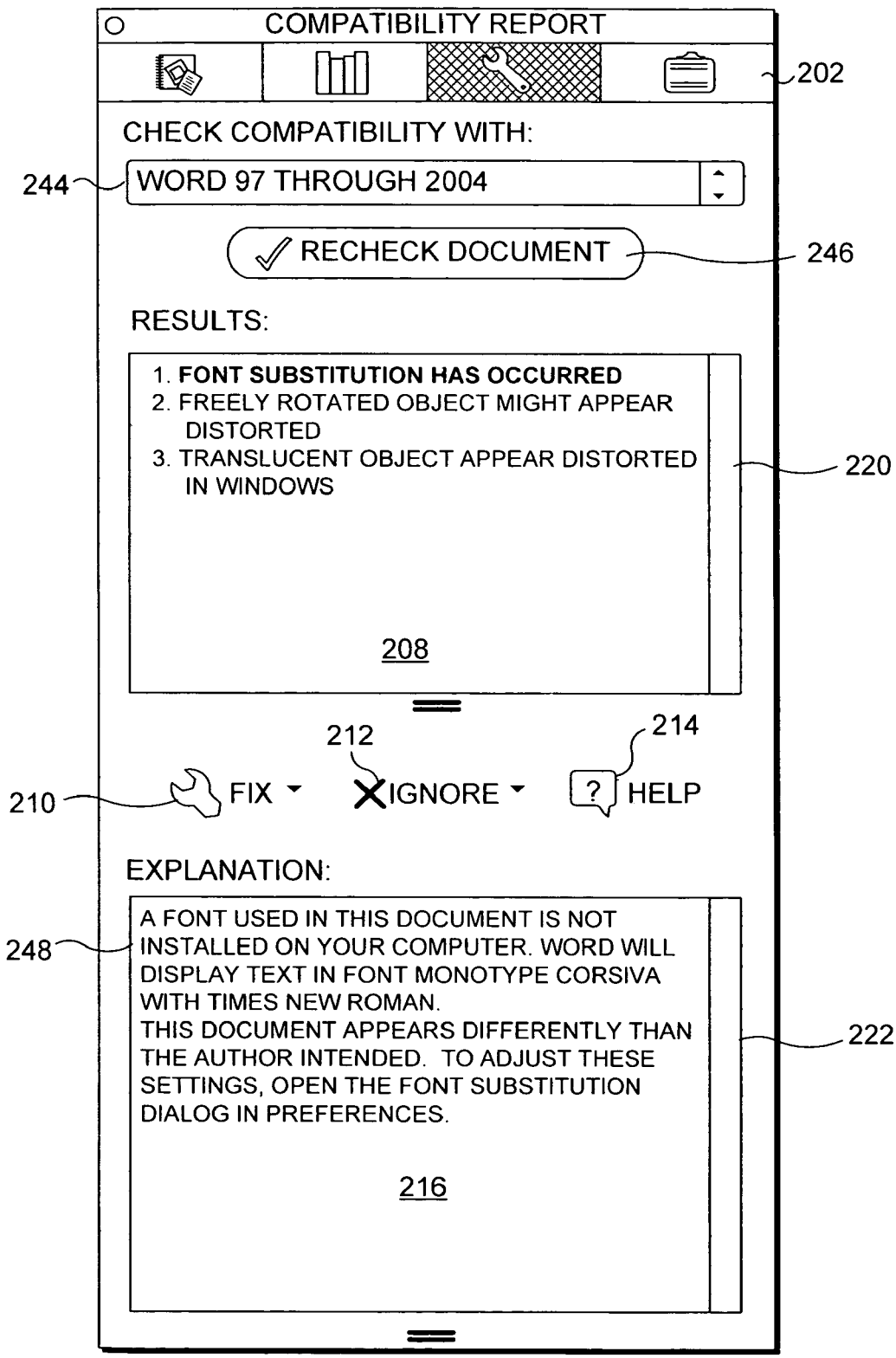
FIG. 6 is an exemplary compatibility report that is displayed by an embodiment of present invention after changes have been made in the document following a previous scan to detect any compatibility issues.

FIG. 6 illustrates an exemplary compatibility report 240 that is displayed to a user, for example, after a user has made changes or edited a document. In this view, the target application drop down list box 244 is displayed, showing the current selected target application, and giving the user the opportunity to select a different target application or computing platform when rescanning the document. Since the user has made a change to the current document that is open by inserting the file within it, a Recheck Document control button 246 is now displayed, giving the user the opportunity to rescan the document for compatibility issues. Results of the scan last made are illustrated in results dialog box 208. In this case, a first compatibility issue has been highlighted, indicating that "font substitution has occurred." Explanation dialog box 216 includes an explanation 248 indicating that "a font used in this document is not installed on your computer." In this case, the user may have imported one or more paragraphs in which the indicated font is used from another document created on a different computer. The user is also advised regarding the nature of the font substitution that will be applied, and in regard to the steps that might be taken to correct the compatibility issue. Other aspects of the exemplary compatibility report shown in FIG. 6 are like those in FIG. 5.

Figure 7:
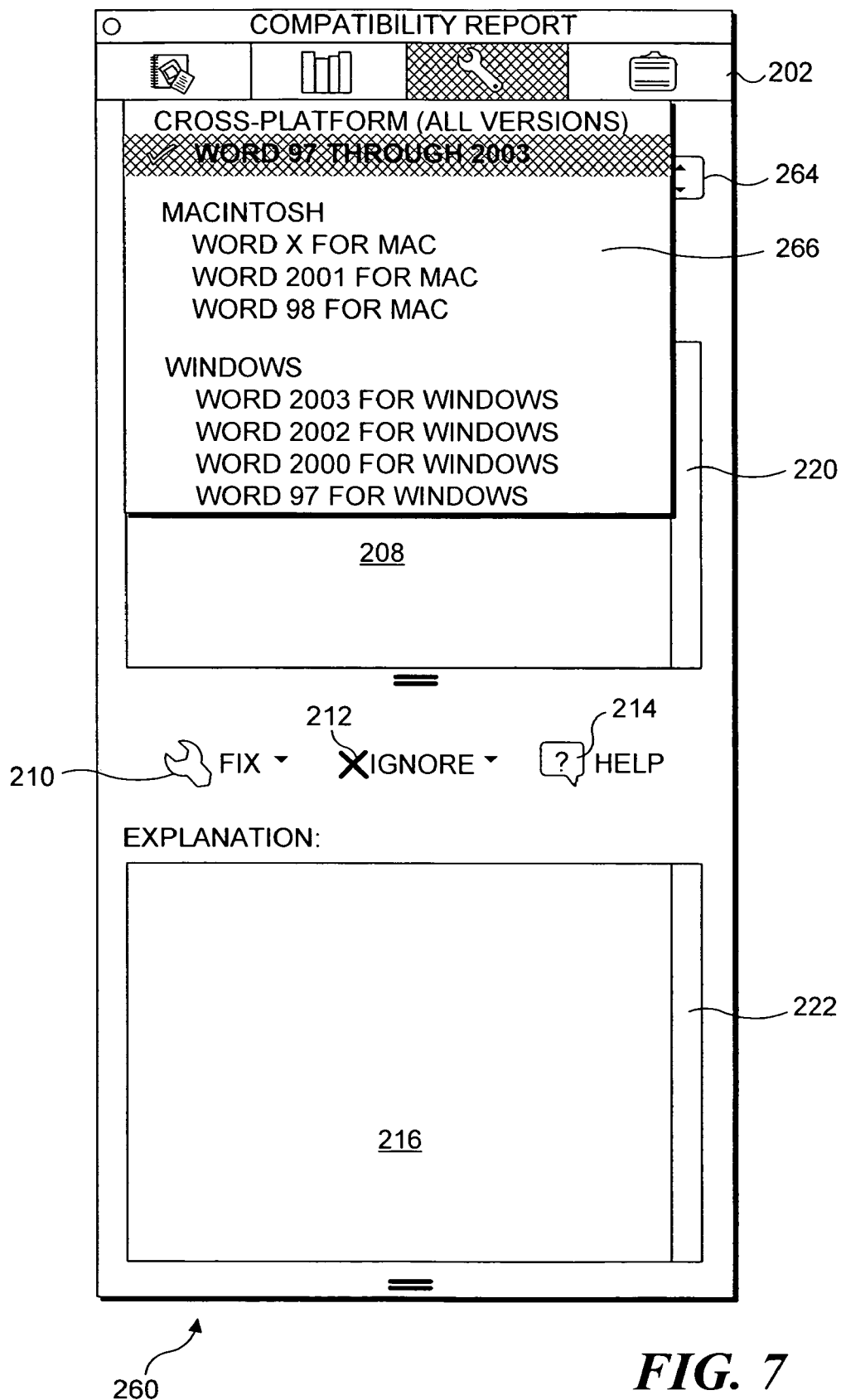
FIG. 7 illustrates an example of a drop down list box in which a user is presented with a plurality of target applications from which to choose before the compatibility report is produced.

In FIG. 7, an exemplary compatibility report 260 is illustrated to show the options listed when the user selects a target application drop down list box 264, displaying a list 266 of available computing platforms and corresponding target applications from which the user can select. Currently, one of these options is selected and highlighted, although a user can select a different option from the list, as desired.

Table 1, which follows below, provides an exemplary list of target applications and computing platforms for the three different types programs with which the present invention is used in a preferred embodiment, including word processing, spread sheet, and presentation programs. Other components of the exemplary compatibility report shown in FIG. 7 are like those in FIGS. 4 and 5.

TABLE 1

| Targets for Each Application | | |
|---|---|---|
| WORD ™ Target List | EXCEL ™ Target List | POWERPOINT ™ Target List |
| Cross Platform (All Versions) | Cross Platform (All Versions) | Cross Platform (All Versions) |
| Word 97 through 2004 Macintosh | Excel 97 through 2004 Macintosh | PowerPoint 97 through 2004 Macintosh |
| Word X for Mac | Excel X for Mac | PowerPoint X for Mac |
| Word 2001 for Mac | Excel 2001 for Mac | PowerPoint 2001 for Mac |
| Word 98 for Mac | Excel 98 for Mac | PowerPoint 98 for Mac |
| Windows | Windows | Windows |
| Word 2003 for Windows | Excel 2003 for Windows | PowerPoint 2003 for Windows |
| Word 2002 (XP) for Windows | Excel 2002 (XP) for Windows | PowerPoint 2002 (XP) for Windows |
| Word 2000 for Windows | Excel 2000 for Windows | PowerPoint 2000 for Windows |

TABLE 1-continued

Targets for Each Application

| WORD ™ Target List | EXCEL ™ Target List | POWERPOINT ™ Target List |
|---|---|---|
| Word 97 for Windows | Excel 97 for Windows | PowerPoint 97 for Windows |

Figure 8:
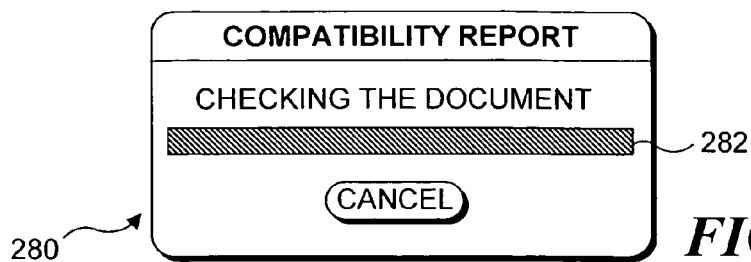
FIG. 8 illustrates a user scanning progress dialog that is displayed in one embodiment, as a document is being scanned to detect compatibility issues.

FIG. 8 illustrates an exemplary scanning progress dialog box 280 that includes a progress bar 282 showing the status of the scan of a document occurring to determine compatibility issues within the document. It may be impractical to show the actual progress of the scan, since the time required to complete the scan might not be readily determinable. In that event, this progress dialog will simply indicate that the scan is occurring.

In FIG. 9, a lower portion 290 of the compatibility report is illustrated to show the options that are provided when the user selects ignore icon 212. The drop down list box that is then displayed includes an option 292 to ignore the current highlighted compatibility issue in the open document. Alternatively, the user can selectively choose an option 294, to ignore all instances of the particular compatibility issue currently highlighted in regard to the current session. If there are multiple occurrences of the same issue in the document, there will be multiple corresponding warnings. If the user clicks option 294 to "Ignore All," all of the warnings for the issue will be deleted. Once option 292 or option 294 is selected, the compatibility issue alert that was highlighted will thus be dismissed and no longer displayed in the compatibility report list during this session. In the event that the compatibility issue only applies to a single occurrence within the document, option 294 will be grayed out. Furthermore, if either option 292 or option 294 is selected, the compatibility issue that is selectively ignored by the user in the current session will still be displayed in the compatibility report in subsequent sessions, unless fixed. In contrast, if the user selects an option 296, the currently selected and highlighted compatibility issue and all other occurrences of that issue within the document will be dismissed and no longer displayed in the compatibility report. Furthermore, selecting option 296 will prevent this alert from triggering again in this application in this an all subsequent sessions for this specific type of compatibility issue. Selecting option 296 causes that choice to be stored in the preferences for the current user, in the current application.

In a similar manner, although not shown in the Figures, if Fix icon 210 is selected to fix a compatibility issue selected in the compatibility report, a drop down list box is displayed giving the user the option to "Fix once," or "Fix all." Again, each instance of an issue in a document will generate a warning to the user. If the user selects the "Fix once" option, then the current instance of the compatibility issue selected in the document is fixed, and that compatibility issue is removed from the list of compatibility issues in the compatibility report. Similarly, if the user selects the "Fix all" option, all instances of that particular compatibility issue are fixed within the current document and that compatibility issue is also removed from the list of compatibility issues for the current document, so that all corresponding warnings are deleted. However, the "Fix all" option is grayed out if there is only a single occurrence of a compatibility issue within the current document.

Although not all compatibility issues can be automatically fixed, where possible, the "Fix once" or "Fix all" option will automatically fix a compatibility issue, after advising the user of how the issue will be fixed and receiving the user's decision to do so, without requiring further user intervention. In those cases where it is not possible to automatically fix a compatibility issue, the user will be advised how the compatibility issue can be manually addressed.

FIG. 10 illustrates a Preferences dialog 300 for a spreadsheet program. As shown in this example, a check box 302 is selected, indicating that the user has chosen to check documents for compatibility issues when the document is opened within the spreadsheet application. A list box 306 includes a compatibility item 304 as one of the options that can be set by selecting an appropriate preference. Since compatibility item 304 is highlighted, the options that can be set to identify user preferences in regard to this topic are displayed, including an option 308 to "Reset ignored alerts," and an option 310 to "Reset all alerts." These control buttons can be selected by a user to enable alerts regarding compatibility issues that were previously ignored by the user to be reset so that they are again displayed to the user within a spreadsheet document during the current session and for future sessions (until fixed). Similarly, control button 310 can be selected to reset all of the alerts whether ignored or not, for a document. Since the check compatibility preference has been selected, a text box 312 provides a description of the selected preference and an explanation 314 indicates that selectively enabling the compatibility report enables the user to check documents for compatibility with other computer platforms and with other versions of the spreadsheet application program.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing a warning to a user when a document that has been created or changed by the user will differ when the document is accessed in a target application, comprising the steps of:
  (a) in response to a predefined state of the document, triggering a scan of the document to detect any compatibility issue that would arise when the document is accessed in the target application, based upon a comparison of the document with a plurality of predefined compatibility issues known to exist for the target application;
  (b) including each compatibility issue detected in a report of compatibility issues; and
  (c) displaying the report of compatibility issues to the user.

2. The method of claim 1, further comprising the step of providing an explanation within the report of any compatibility issue that is detected.

3. The method of claim 1, wherein the predefined state occurs when the user activates a control to selectively trigger the scan of the document to produce the report of compatibility issues.

4. The method of claim 1, wherein the predefined state occurs when the user edits the document, causing each change to the document to be scanned to detect any compatibility issue resulting from the change.

5. The method of claim 1, further comprising the step of enabling a user to do one of:
   (a) selectively fix a specific compatibility Issue indicated In the report of compatibility issues; and
   (b) selectively ignore the specific compatibility issue indicated in the report of compatibility issues.

6. The method of claim 5, wherein the step of enabling the user includes the step of enabling the user to do one of:
   (a) selectively preclude the display of the report of compatibility issues during a current session; and
   (b) selectively preclude compatibility issues from subsequently being detected in any document accessed by the user.

7. The method of claim 1, further comprising the steps of:
   (a) displaying a proposed fix for a compatibility issue; and
   (b) if the proposed fix is accepted, automatically applying the proposed fix to the document to avoid the compatibility issue.

8. The method of claim 1, wherein the predefined compatibility issues identify differences between a current appearance of the document and an appearance of the document when the document is at least one of:
   (a) printed by the target application, where the target application is a different version than an application with which the document was either prepared or edited;
   (b) displayed by the target application, where the target application is a different version than the application with which the document was either prepared or edited;
   (c) printed by the target application using a different type of computing platform than that with which the document was either prepared or edited;
   (d) displayed by the target application using a different type of computing platform than that with which the document was either prepared or edited;
   (e) printed by the target application when a font used in the document is not available to the target application; and
   (f) displayed by the target application when a font used in the document is not available to the target application.

9. The method of claim 1, wherein the predefined compatibility issues relate to at least one of:
   (a) a graphic component that is included in the document;
   (b) a font used in the document;
   (c) a text characteristic used in the document;
   (d) a format used in the document;
   (e) a software module used to carry out functionality used in the document; and
   (f) a parameter applied to a graphic component included in the document.

10. The method of claim 1, wherein the document comprises one of:
    (a) a word processing document;
    (b) a spreadsheet; and
    (c) a presentation document.

11. The method of claim 1, further comprising the step of enabling the user to select the target application from among a plurality of predefined target applications.

12. The method of claim 11, wherein the plurality of predefined target applications include at least one of:
    (a) different versions of an application in which the document is currently open; and
    (b) a different computing platform than that on which the document is currently open.

13. A memory medium having machine executable instructions for carrying out the steps of claim 1.

14. A system for providing a warning to a user when a document that has been created or changed by the user will differ when the document is accessed in a target application, comprising:
    (a) a user input device enabling a user to provide input when creating and editing documents;
    (b) a display for displaying documents and visual material;
    (c) a processor coupled to the user input device and to the display; and
    (d) a memory coupled to the processor, the memory storing data for a document and machine instructions for carrying out a plurality of functions, including:
       (i) in response to a predefined state of the document, triggering a scan of the document to detect any compatibility issue that would arise when the document is accessed in the target application, based upon a comparison of the document with a plurality of predefined compatibility issues known to exist for the target application;
       (ii) including each compatibility issue detected in a report of compatibility issues; and
       (iii) displaying the report of compatibility issues to the user.

15. The system of claim 14, wherein the machine instructions further cause the processor to provide an explanation within the report of any compatibility issue that is detected.

16. The system of claim 14, wherein the predefined state occurs when a user activates a control to selectively trigger the scan of the document to produce the report of compatibility issues.

17. The system of claim 14, wherein the predefined state occurs in response to the document being edited, causing each change to the document to be scanned to detect any compatibility issue resulting from the change.

18. The system of claim 14, wherein the machine instructions further cause the processor to enable a user to do one of:
    (a) selectively fix a specific compatibility Issue indicated In the report of compatibility issues; and
    (b) selectively ignore the specific compatibility issue indicated in the report of compatibility issues.

19. The system of claim 18, wherein the machine instructions further cause the processor to enable a user to do one of:
    (a) selectively preclude the display of the report of compatibility issues during a current session; and
    (b) selectively preclude compatibility issues from subsequently being detected in any document accessed by the user.

20. The system of claim 14, wherein the machine instructions further cause the processor to:
    (a) display a proposed fix for a compatibility issue; and
    (b) if the proposed fix is accepted, automatically apply the proposed fix to the document to avoid the compatibility issue.

21. The system of claim 14, wherein the predefined compatibility issues identify differences between a current appearance of the document and an appearance of the document when the document is at least one of:
    (a) printed by the target application, where the target application is a different version than an application currently being executed by the processor to access the document;

(b) displayed by the target application, where the target application is a different version than the application currently being executed by the processor to access the document;
(c) printed by the target application using a different type of computing platform than that of the system;
(d) displayed by the target application using a different type of computing platform than that of the system;
(e) printed by the target application when a font used in the document is not available to the target application; and
(f) displayed by the target application when a font used in the document is not available to the target application.

22. The system of claim 14, wherein the predefined compatibility issues relate to at least one of:
(a) a graphic component that is included in the document;
(b) a font used in the document;
(c) a text characteristic used in the document;
(d) a format used in the document;
(e) a software module used to carry out functionality used in the document; and
(f) a parameter applied to a graphic component included in the document.

23. The system of claim 14, wherein the document comprises one of:
(a) a word processing document;
(b) a spreadsheet; and
(c) a presentation document.

24. The system of claim 14, wherein the machine instructions further cause the processor to select the target application from among a plurality of predefined target applications.

25. The system of claim 24, wherein the plurality of predefined target applications include at least one of:
(a) different versions of an application in which the document is currently open; and
(b) a different computing platform than that of the system.

* * * * *